US011971608B2

(12) United States Patent
Wang et al.

(10) Patent No.: US 11,971,608 B2
(45) Date of Patent: Apr. 30, 2024

(54) OPTICAL LENS ASSEMBLY (71) Applicant: NINGBO SUNNY AUTOMOTIVE OPTECH CO., LTD, Ningbo (CN)

(72) Inventors: Dongfang Wang, Ningbo (CN); Bo Yao, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 715 days.

(21) Appl. No.: 17/121,478

(22) Filed: Dec. 14, 2020

(65) Prior Publication Data

US 2021/0096328 A1 Apr. 1, 2021

Related U.S. Application Data (63) Continuation of application No. PCT/CN2019/079982, filed on Mar. 28, 2019.

(30) Foreign Application Priority Data

Aug. 3, 2018 (CN) .......................... 201810874833.9

(51) Int. Cl.
*G02B 9/00* (2006.01)
*G02B 9/64* (2006.01)
(Continued)

(52) U.S. Cl.
CPC ........... *G02B 9/64* (2013.01); *G02B 13/0045* (2013.01); *G02B 13/006* (2013.01); *G02B 13/06* (2013.01); *G02B 13/18* (2013.01)

(58) Field of Classification Search
CPC ...... G02B 13/006; G02B 13/06; G02B 13/18; G02B 9/34; G02B 13/004; G02B 13/005;
(Continued)

(56) References Cited

U.S. PATENT DOCUMENTS

2016/0124192 A1 5/2016 Koreeda
2017/0351051 A1* 12/2017 Kawamura ............... G02B 9/64
2018/0059362 A1* 3/2018 Yeh ........................ G02B 1/041

FOREIGN PATENT DOCUMENTS

CN 201555978 U 8/2010
CN 103777332 A 5/2014
(Continued)

OTHER PUBLICATIONS

International Search Report issued in corresponding International Application No. PCT/CN2019/079982; dated Jul. 4, 2019; State Intellectual Property Office of the P.R. China, Beijing, China, 6 pgs.

Primary Examiner — James C. Jones
Assistant Examiner — Henry Duong
(74) Attorney, Agent, or Firm — HAUPTMAN HAM, LLP (57) ABSTRACT The present disclosure discloses an optical lens assembly. The optical lens assembly may include, sequentially from an object side to an image side along an optical axis, a first lens, a second lens, a third lens, a fourth lens, a fifth lens, a sixth lens and a seventh lens. The first lens may have negative refractive power, a convex object-side surface and a concave image-side surface. The fourth lens may have positive refractive power, a convex object-side surface and a convex image-side surface. The fifth lens may have positive refractive power, a convex object-side surface and a convex image-side surface. The sixth lens may have negative refractive power, a concave object-side surface and a concave image-side surface. The seventh lens may have positive refractive power and a convex object-side surface.

20 Claims, 3 Drawing Sheets (51) Int. Cl.
*G02B 13/00* (2006.01)
*G02B 13/06* (2006.01)
*G02B 13/18* (2006.01)

(58) Field of Classification Search
CPC .... G02B 9/00–64; G02B 13/002–0045; G02B 3/04; G02B 15/00–28; G02B 13/02; G02B 13/04; G03B 30/00
USPC ............... 359/708–718, 676–695, 745–795
See application file for complete search history.

(56) References Cited

FOREIGN PATENT DOCUMENTS

| | | | | |
|---|---|---|---|---|
| CN | 105093487 A | 11/2015 | | |
| CN | 107193114 A | 9/2017 | | |
| CN | 207020384 U | 2/2018 | | |
| CN | 107783252 A | 3/2018 | | |
| CN | 207074298 U | 3/2018 | | |
| CN | 110632736 A | * 12/2019 | ......... | G02B 13/0045 |
| WO | 2017160092 A2 | 9/2017 | | |

* cited by examiner

OPTICAL LENS ASSEMBLY

CROSS-REFERENCE TO RELATED APPLICATIONS

The present patent application is a continuation of International Application PCT/CN2019/079982, filed on Mar. 28, 2019, which claims benefit of priority to Chinese Patent Application No. 201810874833.9 filed on Aug. 3, 2018 before the China National Intellectual Property Administration. All of the aforementioned patent applications are hereby incorporated by reference in their entireties.

TECHNICAL FIELD

The present disclosure relates to an optical lens assembly, and more particularly, to an optical lens assembly including seven lenses.

BACKGROUND

Advanced driving assistance system (ADAS) is a system which uses various sensors installed in the car to sense surroundings, collect data, identify static and dynamic objects, detect and track objects, carry out the computing and analysis of the system by combining with the navigator map data at any time during the car-driving, which allows the driver to perceive the possible dangers in advance and increases the comfort and safety during the car-driving.

In recent years, ADAS market has been growing rapidly, and ADAS needs a key component, that is, an optical lens assembly, to play a role in actual driving. For safety reasons, ADAS has very high requirements for on-board lenses in practical use.

The optical lenses, such like on-board lenses have strict requirements on miniaturization. The relatively large lens size causes problems in the actual use of the lenses. For example, the large size of the front-view lens mounted behind the front windshield will cause disturbance to driving. The large size of the lens will also challenge the overall layout of the car. Based on the original on-board optical lens assembly, the optical lens assembly applied in ADAS will adopt 7 or more lenses in order to improve the ability of image resolution. Therefore, the lens assembly used in ADAS is generally much larger than the normal on-board lens assembly, and may even be about twice as large, which makes the miniaturization of the on-board optical lens assembly more demanding and also needs to meet the increasing resolution requirement of the optical lens assembly. In addition, this kind of optical lens assembly also requires a larger aperture for clear identification in low-light environment.

SUMMARY

The present disclosure provides an optical lens assembly that is applicable to on-board installation and at least overcomes or partially overcomes at least one of the above-mentioned deficiencies of the prior art.

One aspect of the present disclosure provides an optical lens assembly which may include, sequentially from an object side to an image side along an optical axis, a first lens, a second lens, a third lens, a fourth lens, a fifth lens, a sixth lens, and a seventh lens. The first lens may have negative refractive power, a convex object-side surface and a concave image-side surface. The second lens and the third lens may be cemented to each other to form a first cemented lens. The fourth lens may have positive refractive power, a convex object-side surface and a convex image-side surface. The fifth lens may have positive refractive power, a convex object-side surface and a convex image-side surface. The sixth lens may have negative refractive power, a concave object-side surface and a concave image-side surface. The seventh lens may have positive refractive power and a convex object-side surface.

In an embodiment, the second lens of the first cemented lens may have negative refractive power, a concave object-side surface and a convex image-side surface; and the third lens of the first cemented lens may have positive refractive power, a concave object-side surface and a convex image-side surface.

In an embodiment, the second lens of the first cemented lens may have negative refractive power, a convex object-side surface and a concave image-side surface; and the third lens of the first cemented lens may have positive refractive power, a convex object-side surface and a concave image-side surface.

In an embodiment, the second lens of the first cemented lens may have negative refractive power, a concave object-side surface and a concave image-side surface; and the third lens of the first cemented lens may have positive refractive power, a convex object-side surface and a convex image-side surface.

In an embodiment, the fifth lens, the sixth lens and the seventh lens may be cemented to form a second cemented lens.

In an embodiment, the optical lens assembly may have at least two aspheric lenses.

In an embodiment, at least one of the fifth lens, the sixth lens and the seventh lens may be an aspheric lens.

In an embodiment, a radius of curvature R1 of the object-side surface of the first lens, a radius of curvature R2 of the image-side surface of the first lens and a center thickness d1 of the first lens may satisfy $0.5 \leq R1/(R2+d1) \leq 1.5$.

In an embodiment, a radius of curvature R7 of the object-side surface of the fourth lens and a radius of curvature R8 of the image-side surface of the fourth lens may satisfy $|R7/R8| \leq 3.5$.

In an embodiment, a maximum field-of-view FOV of the optical lens assembly, a maximum effective aperture diameter D of an object-side surface of the first lens corresponding to the maximum field-of-view of the optical lens assembly, and an image height h corresponding to the maximum field-of-view of the optical lens assembly may satisfy $D/h/FOV \leq 0.035$.

In an embodiment, a distance TTL along the optical axis from a center of the object-side surface of the first lens to an imaging plane of the optical lens assembly, and a total focal length F of the optical lens assembly may satisfy $TTL/F \leq 4.8$.

In an embodiment, a distance TTL along the optical axis from a center of the object-side surface of the first lens to an imaging plane of the optical lens assembly, and a distance BFL along the optical axis from a center of the image-side surface of the seventh lens to an imaging plane of the optical lens assembly may satisfy $BFL/TTL \geq 0.11$.

In an embodiment, an air gap D12 between the first lens and the second lens and a distance TTL along the optical axis from a center of the object-side surface of the first lens to an imaging plane of the optical lens assembly may satisfy $D12/TTL \geq 0.08$.

In an embodiment, a focal length F567 of a cemented lens consisted of the fifth lens, the sixth lens and the seventh lens and a total focal length F of the optical lens assembly may satisfy F567/F≤8.

Another aspect of the present disclosure provides an optical lens assembly which may include, sequentially from an object side to an image side along an optical axis, a first lens, a second lens, a third lens, a fourth lens, a fifth lens, a sixth lens, and a seventh lens. Each of the first lens, the second lens and the sixth lens may have negative refractive power. Each of the third lens, the fourth lens, the fifth lens and the seventh lens may have positive refractive power. The second lens and the third lens may be cemented to each other to form a first cemented lens. The fifth lens, the sixth lens and the seventh lens may be cemented to form a second cemented lens. A distance TTL along the optical axis from a center of the object-side surface of the first lens to an imaging plane of the optical lens assembly, and a total focal length F of the optical lens assembly may satisfy TTL/F≤4.8.

In an embodiment, an object-side surface of the first lens may be convex and an image-side surface thereof may be concave.

In an embodiment, an object-side surface of the second lens of the first cemented lens may be concave and an image-side surface thereof may be convex; and an object-side surface of the third lens of the first cemented lens may be concave and an image-side surface thereof may be convex.

In an embodiment, an object-side surface of the second lens of the first cemented lens may be convex and an image-side surface thereof may be concave; and an object-side surface of the third lens of the first cemented lens may be convex and an image-side surface thereof may be concave.

In an embodiment, both of an object-side surface and an image-side surface of the second lens of the first cemented lens may be concave; and both of an object-side surface and an image-side surface of the third lens of the first cemented lens may be convex.

In an embodiment, both of an object-side surface and an image-side surface of the fourth lens may be convex.

In an embodiment, both of an object-side surface and an image-side surface of the fifth lens may be convex.

In an embodiment, both of an object-side surface and an image-side surface of the sixth lens may be concave.

In an embodiment, an object-side surface of the seventh lens may be convex and an image-side surface thereof may be convex or concave.

In an embodiment, the optical lens assembly may have at least two aspheric lenses.

In an embodiment, at least one of the fifth lens, the sixth lens and the seventh lens may be an aspheric lens.

In an embodiment, a radius of curvature R1 of the object-side surface of the first lens, a radius of curvature R2 of the image-side surface of the first lens and a center thickness d1 of the first lens may satisfy 0.5≤R1/(R2+d1)≤1.5.

In an embodiment, a radius of curvature R7 of the object-side surface of the fourth lens and a radius of curvature R8 of the image-side surface of the fourth lens may satisfy |R7/R8|≤3.5.

In an embodiment, a maximum field-of-view FOV of the optical lens assembly, a maximum effective aperture diameter D of an object-side surface of the first lens corresponding to the maximum field-of-view of the optical lens assembly, and an image height h corresponding to the maximum field-of-view of the optical lens assembly may satisfy D/h/FOV≤0.035.

In an embodiment, a distance TTL along the optical axis from a center of the object-side surface of the first lens to an imaging plane of the optical lens assembly, and a distance BFL along the optical axis from a center of the image-side surface of the seventh lens to an imaging plane of the optical lens assembly may satisfy BFL/TTL≥0.11.

In an embodiment, an air gap D12 between the first lens and the second lens and a distance TTL along the optical axis from a center of the object-side surface of the first lens to an imaging plane of the optical lens assembly may satisfy D12/TTL≥0.08.

In an embodiment, a focal length F567 of the second cemented lens and a total focal length F of the optical lens assembly may satisfy F567/F≤8.

In the present disclosure, for example, seven lenses are used. By optimizing the shape of the lenses, rationally distributing the refractive power of each lens, forming a cemented lens, and the like, at least one of the beneficial effects such as small front-end aperture, high resolution, miniaturization and large aperture of an optical lens assembly is achieved.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

For a better understanding of the present disclosure, various aspects of the present disclosure will be described in more detail with reference to the accompanying drawings. It should be understood that the detailed descriptions are merely used for describing exemplary embodiments of the present disclosure, but not intend to limit the scope of the present disclosure in any way. Throughout the specification, like reference numerals refer to like elements. The expression "and/or" includes any and all combinations of one or more of the associated listed items.

It should be noted that, in the present specification, the expressions such as first, second, third, etc., are merely used for distinguishing one feature from another feature without limiting the feature. Thus, a first lens discussed below may also be referred to as a second lens or a third lens, and a first cemented lens may also be referred to as a second cemented lens, without departing from the teachings of the present disclosure.

In the drawings, thicknesses, sizes and shapes of the lenses have been slightly exaggerated for ease of illustration. In particular, spherical or aspheric shapes shown in the drawings are shown by way of example. That is, spherical or aspheric shapes are not limited to the spherical or aspheric shapes shown in the drawings. The drawings are merely examples, and not strictly drawn to scale.

Herein, a paraxial region refers to the region near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave to at least in the paraxial region. The surface of each lens closest to the object is referred to as object-side surface, and the surface of each lens closest to the imaging plane is referred to as image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to exemplary embodiments of the present disclosure includes, for example, seven lenses having refractive power, which are a first lens, a second lens, a third lens, a fourth lens, a fifth lens, a sixth lens, and a seventh lens. The seven lenses are arranged sequentially along an optical axis from an object side to an image side.

The optical lens assembly according to an exemplary embodiment of the present disclosure may further include a photosensitive element disposed on an imaging plane. Alternatively, the photosensitive element disposed on the imaging plane may be a Charge-Coupled Device element (CCD) or a Complementary Metal-Oxide Semiconductor element (CMOS).

The first lens may have negative refractive power, and its object-side surface may be convex, and its image-side surface may be concave. The first lens is provided as a meniscus lens convex towards the object-side, which can collect the light rays into the rear optical system as much as possible. In practical applications, considering the vehicle lens will be used in severe weather conditions such as rain and snow, the meniscus shape convex towards the object-side is conducive to the dripping of the water droplets and therefore also conductive to the barrier-free use of the optical lens assembly in severe weather such as rain and snow, thereby reducing the influence on imaging. Optionally, the first lens may be made of material with a relatively high refractive index to improve the ability of the imaging resolution.

The second lens may have negative refractive power. Optionally, the second lens may be provided as a meniscus lens or a biconcave lens.

The third lens may have positive refractive power. Optionally, the third lens may be provided as a meniscus lens or a biconvex lens.

The fourth lens may have positive refractive power, and both of its object-side surface and its image-side surface may be convex. The fourth lens may properly converge the light rays, so that a smooth transition of the light rays from the third lens to the rear optical system can be established.

The fifth lens may have positive refractive power, and both of its object-side surface and its image-side surface may be convex.

The sixth lens may have negative refractive power, and both of its object-side surface and its image-side surface may be concave.

The seventh lens may have positive refractive power, and its object-side surface may be convex, and its image-side surface may optionally be convex or concave.

In an exemplary embodiment, a stop for limiting the light beam may be provided between, for example, the third lens and the fourth lens, to further improve the imaging quality of the lens assembly. When the stop is arranged between the third lens and the fourth lens, the front-end aperture may be reduced. At the same time, when the stop is arranged between the third lens and the fourth lens, the light may be condensed and transferred to the fourth lens, which may reduce the sensitivity of the lens assembly structurally. It should be noted, however, that the position of the stop disclosed herein is only an example and not a limitation; in alternative embodiments, the stop may also be placed in other positions as required.

In an exemplary embodiment, the optical lens assembly according to the present disclosure may further include a filter disposed between the seventh lens and the imaging plane to filter light having different wavelengths, as desired. Also, the optical lens assembly may further include a protective glass disposed between the filter and the imaging plane to prevent damage to an internal component (e.g., a chip) of the optical lens assembly.

As known to those skilled in the art, a cemented lens may be used to minimize or eliminate color aberrations. The use of a cemented lens in an optical lens assembly may improve the image quality and reduce the reflection losses of light energy, thereby improving the sharpness of the lens assembly. In addition, the use of a cemented lens may also simplify the assembly procedure in the lens assembly manufacturing process.

In an exemplary embodiment, the second lens and the third lens may be combined into a first cemented lens by cementing the image-side surface of the second lens and the object-side surface of the third lens. The first cemented lens consists of a positive lens (that is, the third lens) and a negative lens (that is, the second lens). The positive lens has a relatively high refractive index and a relative low Abbe number, and the negative lens has a relatively low refractive index and a relative high Abbe number (compared to the positive lens). Combining the material with a high refractive index and a low Abbe number and the material with a low refractive index and a high Abbe number is conducive to the rapid transition of light from the front system, increasing the aperture of the stop, and meeting the requirements of night vision. In addition, the use of the first cemented lens may effectively reduce the color aberration of the system, balance the color aberration of the system, and make the whole optical system compact to meet the requirements of miniaturization. At the same time, the first cemented lens may reduce the tolerance sensitivity of the lens unit due to tilt/eccentricity and the like generated in the assembling process. If the separate lens is placed at the turning point of the optical path, it is easy to be sensitive due to the processing/assembly error, so the setting of the cemented lens reduces effectively the sensitivity.

In the first cemented lens, the second lens near the object side has negative refractive power, and the third lens near the image side has positive refractive power. The arrangement of the negative lens at the front and the positive lens at the rear may diverge and rapidly converge the light from the front before transitioning to the rear, which is more conducive to reducing the light path of the rear and realizing a short TTL. In the first cemented lens, the second lens and the third lens have mutually matching shapes. When the second lens has a meniscus shape, the third lens correspondingly has a meniscus shape. When the second lens has a biconcave shape, the third lens correspondingly has a biconvex shape. The overall shape is designed in such a way that the space between the first lens and the second lens can be larger, and the smooth transition zone of the light rays can be larger, so that the light rays can reach the second lens more smoothly.

In an exemplary embodiment, by cementing the image-side surface of the fifth lens with the object-side surface of the sixth lens and cementing the image-side surface of the sixth lens with the object-side surface of the seventh lens, the fifth lens, the sixth lens and the seventh lens can be cemented to form a second cemented lens. The second cemented lens is a triple cemented lens, and the use of the triple cemented lens may have the following beneficial effects: (1) reducing the air spaces between the three lenses and therefore reducing the total optical length of the system; (2) reducing the number of assembling components between the three lenses and therefore reducing the assembling process and the cost; (3) reducing the tolerance sensitivity of the lens unit due to tilt/eccentricity and the like generated in the assembling process; (4) reducing the loss of light amount caused by reflection between the lenses and improve the illuminance; (5) further reducing the field curvature and correct the off-axis point aberration of the system.

In the second cemented lens, the fifth lens has positive refractive power, the sixth lens has negative refractive power, and the seventh lens has positive refractive power. Properly configuring the shapes and the refractive power of the three lenses may smoothly transition the light emitted from the fourth lens to the imaging plane, which may improve the imaging resolution and optimize the optical properties such as distortion and CRA under the condition of compact structure. Such configuration makes the structure of the optical system compact and contributes to the miniaturization of the lens assembly, which may in general reduce the total optical length of the system and the rear aperture/size of the lens assembly.

The use of the first cemented lens and the second cemented lens may correct the overall color aberration of the system and effectively reduce the color aberration and the tolerance sensitivity of the system and facilitates the assembling of the system.

In an exemplary embodiment, a radius of curvature R1 of the object-side surface of the first lens, a radius of curvature R2 of the image-side surface of the first lens and a center thickness d1 of the first lens may satisfy $0.5 \leq R1/(R2+d1) \leq 1.5$, and more desirable, may further satisfy $0.7 \leq R1/(R2+d1) \leq 1.3$. The special shape setting of the first lens may collect as much light as possible and allow it to enter the rear optical system, thereby increasing the amount of light passing. At the same time, the special shape setting of the first lens may improve the imaging performance.

In an exemplary embodiment, a radius of curvature R7 of the object-side surface of the fourth lens and a radius of curvature R8 of the image-side surface of the fourth lens may satisfy $|R7/R8| \leq 3.5$, and more desirable, may further satisfy $0.2 \leq |R7/R8| \leq 2$. The special shape setting of the fourth lens may help the transition of light from the front and achieve a proper convergence of the light. If the value of $|R7/R8|$ being too large, the convergence ability of the lens will be affected and the light may not be able to enter the rear optical system smoothly.

In an exemplary embodiment, a maximum field-of-view FOV of the optical lens assembly, a maximum effective aperture diameter D of an object-side surface of the first lens corresponding to the maximum field-of-view of the optical lens assembly, and an image height h corresponding to the maximum field-of-view of the optical lens assembly may satisfy $D/h/FOV \leq 0.035$, and more desirable, may further satisfy $D/h/FOV \leq 0.028$. Satisfying the condition expression $D/h/FOV \leq 0.035$ may realize the small front-end aperture of the lens assembly.

In an exemplary embodiment, an optical total length TTL of the optical lens assembly and a total focal length F of the optical lens assembly may satisfy $TTL/F \leq 4.8$, and more desirable, may further satisfy $TTL/F \leq 4.5$. Satisfying the condition expression $TTL/F \leq 4.8$ may ensure the miniaturization of the lens assembly.

In an exemplary embodiment, an optical back focal length BFL of the optical lens assembly and an optical total length TTL of the optical lens assembly may satisfy $BFL/TTL \geq 0.11$, and more desirable, may further satisfy $BFL/TTL \geq 0.15$. Satisfying the condition expression $BFL/TTL \geq 0.11$ is conducive to assembling of the optical system considering the overall structure of the optical lens assembly.

In an exemplary embodiment, an air gap D12 between the first lens and the second lens and an optical total length TTL of the optical lens assembly may satisfy $D12/TTL \geq 0.08$, and more desirable, may further satisfy $D12/TTL \geq 0.11$. By satisfying the condition expression $D12/TTL \geq 0.08$, the space between the first lens and the second lens is larger, which makes the smooth transition zone of the light larger, so that the light may reach the second lens more smoothly.

In an exemplary embodiment, a focal length F567 of the cemented lens which consists of the fifth lens, the sixth lens and the seventh lens, and a total focal length F of the optical lens assembly may satisfy $F567/F \leq 8$, and more desirable, may further satisfy $2 \leq F567/F \leq 5$. By properly distributing the refractive power of the lens assembly, the imaging stability of the lens assembly may be improved at both of low and high temperatures.

In an exemplary embodiment, the optical lens assembly according to the present disclosure may have at least two aspheric lenses. More specifically, at least one of the fifth lens, the sixth lens and the seventh lens may be aspheric. Aspheric lenses are characterized by a continuous change in curvature from the center of the lens to the periphery. Unlike spherical lenses, which have a constant curvature from the center of the lens to the periphery, aspheric lenses have better radius of curvature characteristics and have the advantages of improving distortion and astigmatic aberration. With the aspheric lens, aberrations occurring during imaging can be eliminated as much as possible, thereby improving the imaging quality of the lens. Optionally, the first lens may be an aspheric lens to improve imaging resolution and other performance. It will be appreciated that, in order to improve the imaging quality, the number of aspheric lenses of the optical lens assembly according to the present disclosure may be increased.

In an exemplary embodiment, the optical lens assembly according to the present disclosure may employ a plastic lens or a glass lens. The coefficient of thermal expansion of the lens made of the plastic material is large, and when the ambient temperature of the lens changes greatly, the plastic lens will cause a large change in the optical back focal length of the lens. Using lenses made of glass material may reduce the effect on the optical back focal length of the lens assembly caused by temperature, but the cost is high. The first lens of the optical lens assembly according to the present disclosure may be a glass lens to reduce the environment impact on the whole system and improve the overall performance of the optical lens assembly. Ideally, the first lens may be an aspheric lens to further improve the imaging quality.

By optimizing the shape of the lenses, and rationally distributing the refractive power and choosing the materials of the lenses, the optical lens assembly according to above-described embodiments of the present disclosure may reduce the front-end aperture, shorten TTL and ensure the miniaturization of the lens assembly. At the same time, the optical lens assembly according to the present disclosure may achieve high resolution, large aperture, good imaging effect and high-definition image quality. The imaging may be clear even in low-light environment or at night. The optical lens assembly according to above-described embodiments of the present disclosure may better meet the requirements of the on-board lens assembly and even ADAS.

However, it will be appreciated by those skilled in the art that the number of lenses constituting the lens may be varied without departing from the claimed technical solution of the present disclosure to obtain the various results and advantages described in this specification. For example, although seven lenses have been described in the embodiment, the optical lens assembly is not limited to include seven lenses. If desired, the optical lens assembly may also include other numbers of lenses.

Specific embodiments of an optical lens assembly applicable to the above-described embodiments are further described below with reference to the accompanying drawings.

Example 1

Figure 1:
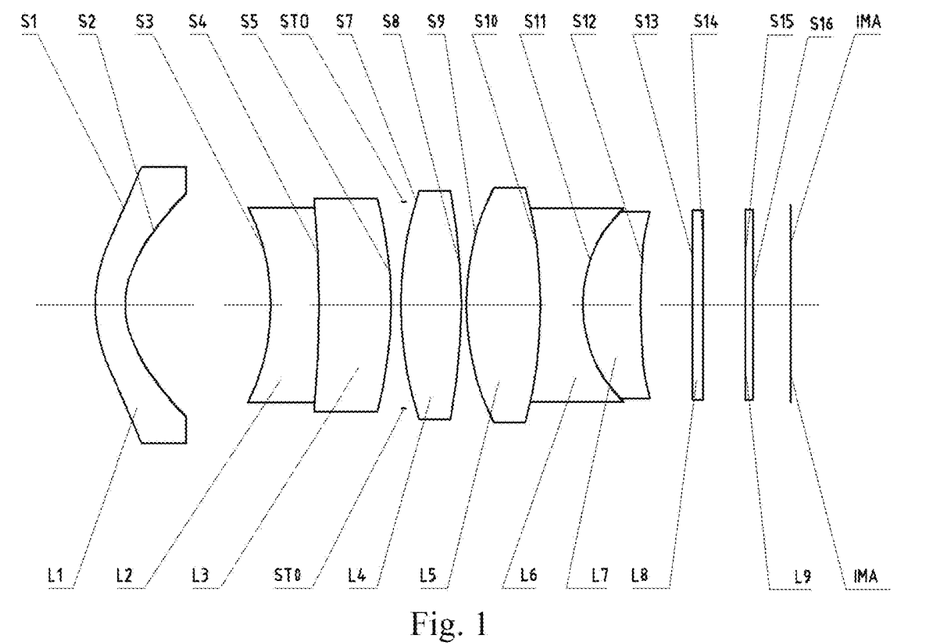
FIG. 1 is a schematic structural diagram showing an optical lens assembly according to Example 1 of the present disclosure.

An optical lens assembly according to Example 1 of the present disclosure is described below with reference to FIG. 1. FIG. 1 shows a schematic structural diagram of the optical lens assembly according to Example 1 of the present disclosure.

As shown in FIG. 1, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a meniscus lens having negative refractive power, and its object-side surface S1 is convex and its image-side surface S2 is concave.

The second lens L2 is a meniscus lens having negative refractive power, and its object-side surface S3 is concave and its image-side surface S4 is convex. The third lens L3 is a meniscus lens having positive refractive power, and its object-side surface S4 is concave and its image-side surface S5 is convex. The second lens L2 and the third lens L3 are cemented to each other to form a first cemented lens.

The fourth lens L4 is a biconvex lens having positive refractive power, and both of its object-side surface S7 and its image-side surface S8 are convex.

The fifth lens L5 is a biconvex lens having positive refractive power, and both of its object-side surface S9 and its image-side surface S10 are convex. The sixth lens L6 is a biconcave lens having negative refractive power, and both of its object-side surface S10 and its image-side surface S11 are concave. The seventh lens L7 is a meniscus lens having positive refractive power, and its object-side surface S 11 is convex and its image-side surface S12 is concave. The fifth lens L5, the sixth lens L6 and the seventh lens L7 are cemented to form a second cemented lens.

In the present example, each of the first lens L1, the fifth lens L5 and the seventh lens L7 is an aspheric lens. Both of the object-side surface S1 and the image-side surface S2 of the first lens L1 are aspheric, the object-side surface S9 of the fifth lens L5 is aspheric, and the image-side surface S12 of the seventh lens L7 is aspheric.

Optionally, the optical lens assembly may further include a filter L8 having an object-side surface S13 and an image-side surface S14 and a protective lens L9 having an object-side surface S15 and an image-side surface 516. The filter L8 may be used to correct color deviations. The protective lens L9 can be used to protect the image sensing chip located on the imaging plane IMA. The light from an object sequentially passes through the respective surfaces S1 to S16 and is finally imaged on the imaging plane IMA.

In the optical lens assembly of the present example, a stop STO may be provided between the third lens L3 and the fourth lens L4 to improve the imaging quality.

Table 1 shows the radius of curvature R, the thickness T, the refractive index Nd, and the Abbe number Vd of each lens of the optical lens assembly of Example 1, wherein the radius of curvature R and the thickness T are both in units of millimeters (mm).

TABLE 1

| Surface No. | Radius of curvature R | Thickness T | Refractive index Nd | Abbe number Vd |
|---|---|---|---|---|
| S1 | 5.7600 | 1.6000 | 1.81 | 41.00 |
| S2 | 3.8500 | 7.6000 | | |
| S3 | −9.3300 | 2.4300 | 1.49 | 70.42 |
| S4 | −51.4000 | 3.7000 | 1.88 | 40.81 |
| S5 | −18.2000 | 0.6000 | | |
| STO | Infinite | −0.2000 | | |
| S7 | 15.7000 | 3.1000 | 1.62 | 63.41 |
| S8 | −26.0000 | 0.2000 | | |
| S9 | 11.5000 | 3.8000 | 1.62 | 63.41 |
| S10 | −19.9000 | 2.2000 | 1.76 | 27.55 |
| S11 | 6.0000 | 3.0000 | 1.74 | 49.34 |
| S12 | 42.4000 | 2.7000 | | |
| S13 | Infinite | 0.5500 | 1.52 | 64.21 |

TABLE 1-continued

| Surface No. | Radius of curvature R | Thickness T | Refractive index Nd | Abbe number Vd |
|---|---|---|---|---|
| S14 | Infinite | 2.5000 | | |
| S15 | Infinite | 0.4000 | 1.52 | 64.21 |
| S16 | Infinite | 1.1000 | | |
| IMA | Infinite | | | |

In the present embodiment, seven lenses are used as an example. The lens assembly has at least one of the advantages of small front-end aperture, miniaturization, high resolution, large aperture and the like, by rationally distributing the refractive power and the shape of each lens, the center thickness of each lens and the air gap between lenses. Each aspheric surface type Z is limited by the following formula:

$$Z(h) = \frac{ch^2}{1 + \sqrt{1 - (k+1)c^2h^2}} + Ah^4 + Bh^6 + Ch^8 + Dh^{10} + Eh^{12} \quad (1)$$

Wherein, Z is the sag—the axis-component of the displacement of the surface from the aspheric vertex, when the surface is at height h from the optical axis; c is the paraxial curvature of the aspheric surface, c=1/R (that is, the paraxial curvature c is the reciprocal of the curvature radius R in table 1 above); k is the conic coefficient; A, B, C, D and E are all high-order term coefficients. The following table 2 shows the conic coefficient k and the high-order term coefficients A, B, C, D and E applicable to the aspheric surfaces S1-S2, S9 and S12 in Example 1.

TABLE 2

| Surface No. | K | A | B | C | D | E |
|---|---|---|---|---|---|---|
| S1 | −2.9420 | 8.3480E−04 | −5.3243E−05 | 1.1923E−06 | −1.3009E−08 | 2.7958E−11 |
| S2 | −1.8385 | 1.5784E−03 | −9.2271E−05 | 2.7720E−06 | −3.6090E−08 | 4.2503E−10 |
| S9 | 0.1271 | 1.2870E−05 | 1.1325E−07 | −6.5153E−09 | 2.4474E−10 | −5.7789E−12 |
| S12 | 63.8852 | 4.1496E−04 | 4.5565E−06 | −2.5358E−07 | 2.1886E−08 | −6.2819E−10 |

Table 3 below shows a maximum effective aperture diameter D of the object-side surface S1 of the first lens L1 corresponding to a maximum field-of-view of the optical lens assembly, an image height h corresponding to the maximum field-of-view of the optical lens assembly, the maximum field-of-view FOV of the optical lens assembly, a total optical length TTL of the optical lens assembly (i.e., a distance along the optical axis from the center of the object-side surface S1 of the first lens L1 to the imaging plane IMA), a total focal length F of the optical lens assembly, an optical back focal length BFL of the optical lens assembly (i.e., a distance along the optical axis from the center of the image-side surface S12 of the last lens, the seventh lens L7, to the imaging plane IMA), an air gap D12 between the first lens L1 and the second lens L2, a focal length F567 of the second cemented lens (formed by cementing the fifth lens L5, the sixth lens L6 and the seventh lens L7), a radius of curvature R1 of the object-side surface S1 of the first lens L1, a radius of curvature R2 of the image-side surface S2 of the first lens L1, a center thickness d1 of the first lens L1, a radius of curvature R7 of the object-side surface S7 of the fourth lens L4, and a radius of curvature R8 of the image-side surface S8 of the fourth lens L4 of Example 1.

TABLE 3

| D (mm) | 11.94 |
|---|---|
| h (mm) | 9.14 |
| FOV (°) | 68.8 |
| TTL (mm) | 35.28 |
| F (mm) | 8.17 |
| BFL (mm) | 7.250 |
| D12 (mm) | 7.600 |
| F567 (mm) | 30.417 |
| R1 (mm) | 5.76 |
| R2 (mm) | 3.85 |
| d1 (mm) | 1.60 |
| R7 (mm) | 15.700 |
| R8 (mm) | −26.000 |

In this example, the radius of curvature R1 of the object-side surface S1 of the first lens L1, the radius of curvature R2 of the image-side surface S2 of the first lens L1 and the center thickness d1 of the first lens L1 satisfy R1/(R2+d1)=1.057. The maximum field-of-view FOV of the optical lens assembly, the maximum effective aperture diameter D of the object-side surface S1 of the first lens L1 corresponding to the maximum field-of-view of the optical lens assembly, and the image height h corresponding to the maximum field-of-view of the optical lens assembly satisfy D/h/FOV=0.019. The total optical length TTL of the optical lens assembly and the total focal length F of the optical lens assembly satisfy TTL/F=4.317. The optical back focal length BFL of the optical lens assembly and the total optical length TTL of the optical lens assembly satisfy BFL/TTL=0.205. The air gap D12 between the first lens L1 and the second lens L2 and the total optical length TTL of the optical lens assembly satisfy D12/TTL=0.215. The focal length F567 of the second cemented lens and the total focal length F of the optical lens assembly satisfy F567/F=3.722. The radius of curvature R7 of the object-side surface S7 of the fourth lens L4 and the radius of curvature R8 of the image-side surface S8 of the fourth lens L4 satisfy |R7/R8|=0.604.

Example 2

Figure 2:
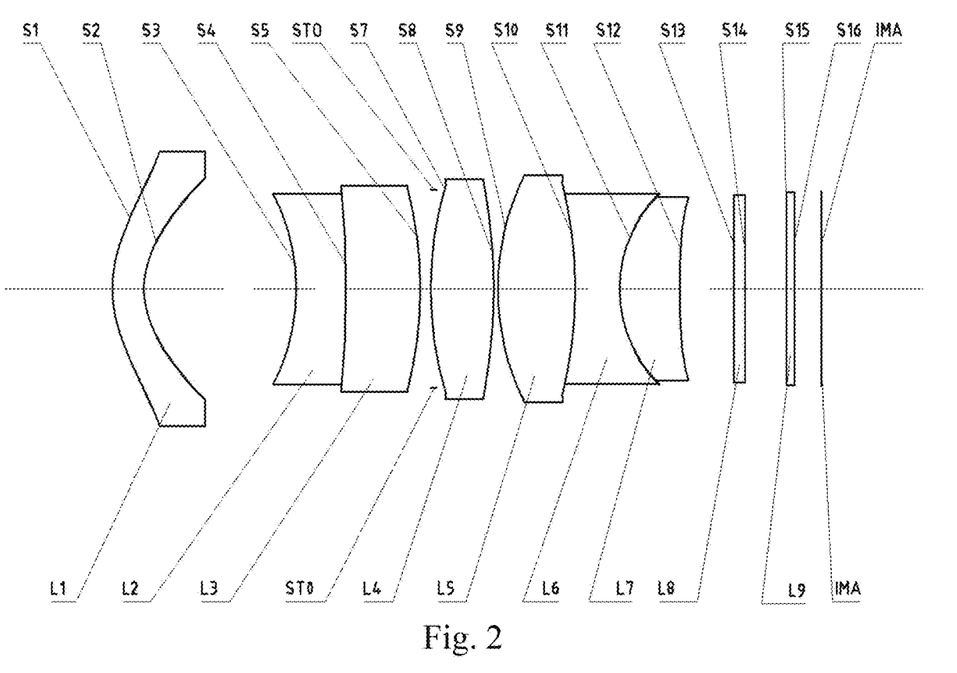
FIG. 2 is a schematic structural diagram showing an optical lens assembly according to Example 2 of the present disclosure.

An optical lens assembly according to Example 2 of the present disclosure is described below with reference to FIG. 2. In this Example and the following Examples, the same description as in Example 1 will be omitted for brevity. FIG. 2 shows a schematic structural diagram of the optical lens assembly according to Example 2 of the present disclosure.

As shown in FIG. 2, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a meniscus lens having negative refractive power, and its object-side surface S1 is convex and its image-side surface S2 is concave.

The second lens L2 is a meniscus lens having negative refractive power, and its object-side surface S3 is concave and its image-side surface S4 is convex. The third lens L3 is a meniscus lens having positive refractive power, and its object-side surface S4 is concave and its image-side surface S5 is convex. The second lens L2 and the third lens L3 are cemented to each other to form a first cemented lens.

The fourth lens L4 is a biconvex lens having positive refractive power, and both of its object-side surface S7 and its image-side surface S8 are convex.

The fifth lens L5 is a biconvex lens having positive refractive power, and both of its object-side surface S9 and its image-side surface S10 are convex. The sixth lens L6 is a biconcave lens having negative refractive power, and both of its object-side surface S10 and its image-side surface S11 are concave. The seventh lens L7 is a meniscus lens having positive refractive power, and its object-side surface S11 is convex and its image-side surface S12 is concave. The fifth lens L5, the sixth lens L6 and the seventh lens L7 are cemented to each other to form a second cemented lens.

In the present example, each of the first lens L1, the fifth lens L5 and the seventh lens L7 is an aspheric lens. Both of the object-side surface S1 and the image-side surface S2 of the first lens L1 are aspheric, the object-side surface S9 of the fifth lens L5 is aspheric, and the image-side surface S12 of the seventh lens L7 is aspheric.

Optionally, the optical lens assembly may further include a filter L8 having an object-side surface S13 and an image-side surface S14 and a protective lens L9 having an object-side surface S15 and an image-side surface S16. The filter L8 may be used to correct color deviations. The protective lens L9 can be used to protect the image sensing chip located on the imaging plane IMA. The light from an object sequentially passes through the respective surfaces S1 to S16 and is finally imaged on the imaging plane IMA.

In the optical lens assembly of the present example, a stop STO may be provided between the third lens L3 and the fourth lens L4 to improve the imaging quality.

Table 4 shows the radius of curvature R, the thickness T, the refractive index Nd, and the Abbe number Vd of each lens of the optical lens assembly of Example 2, wherein the radius of curvature R and the thickness T are both in units of millimeters (mm). The following table 5 shows the conic coefficient k and the high-order term coefficients A, B, C, D and E applicable to the aspheric surfaces S1-S2, S9 and S12 in Example 2. Table 6 below shows a maximum effective aperture diameter D of the object-side surface S1 of the first lens L1 corresponding to the maximum field-of-view of the optical lens assembly, an image height h corresponding to the maximum field-of-view of the optical lens assembly, the maximum field-of-view FOV of the optical lens assembly, a total optical length TTL of the optical lens assembly, a total focal length F of the optical lens assembly, an optical back focal length BFL of the optical lens assembly, an air gap D12 between the first lens L1 and the second lens L2, a focal length F567 of the second cemented lens, a radius of curvature R1 of the object-side surface S1 of the first lens L1, a radius of curvature R2 of the image-side surface S2 of the first lens L1, a center thickness d1 of the first lens L1, a radius of curvature R7 of the object-side surface S7 of the fourth lens L4, and a radius of curvature R8 of the image-side surface S8 of the fourth lens L4 of Example 2.

TABLE 4

| Surface No. | Radius of curvature R | Thickness T | Refractive index Nd | Abbe number Vd |
|---|---|---|---|---|
| S1 | 5.8000 | 1.5700 | 1.81 | 41.00 |
| S2 | 3.8500 | 7.6000 | | |
| S3 | −9.3000 | 2.4300 | 1.49 | 70.42 |
| S4 | −51.4000 | 3.7000 | 1.88 | 40.81 |
| S5 | −18.2000 | 0.6000 | | |
| STO | Infinite | −0.2000 | | |
| S7 | 15.7000 | 3.0000 | 1.62 | 63.41 |
| S8 | −26.1000 | 0.2000 | | |
| S9 | 11.5000 | 3.8000 | 1.62 | 63.41 |
| S10 | −19.9000 | 2.2000 | 1.76 | 27.55 |
| S11 | 6.0000 | 2.9800 | 1.74 | 49.34 |
| S12 | 42.4000 | 2.6900 | | |
| S13 | Infinite | 0.5500 | 1.52 | 64.21 |
| S14 | Infinite | 2.0000 | | |
| S15 | Infinite | 0.4000 | 1.52 | 64.21 |
| S16 | Infinite | 1.4000 | | |
| IMA | Infinite | | | |

TABLE 5

| Surface No. | K | A | B | C | D | E |
|---|---|---|---|---|---|---|
| S1 | −2.9420 | 8.3480E−04 | −5.3243E−05 | 1.1923E−06 | −1.3009E−08 | 1.1183E−10 |
| S2 | −1.8385 | 1.5784E−03 | −9.2271E−05 | 2.7720E−06 | −3.6090E−08 | 4.2503E−10 |
| S9 | 0.1271 | 1.2870E−05 | 1.1325E−07 | −6.5153E−09 | 2.4474E−10 | −5.7789E−12 |
| S12 | 63.8852 | 4.1496E−04 | 4.5565E−06 | −2.5358E−07 | 2.1886E−08 | −6.2819E−10 |

TABLE 6

| | |
|---|---|
| D (mm) | 15.78 |
| h (mm) | 9.17 |
| FOV (°) | 68 |
| TTL (mm) | 34.92 |
| F (mm) | 8.17 |
| BFL (mm) | 7.040 |
| D12 (mm) | 7.600 |
| F567 (mm) | 30.417 |
| R1 (mm) | 5.80 |
| R2 (mm) | 3.85 |
| d1 (mm) | 1.57 |
| R7 (mm) | 15.700 |
| R8 (mm) | −26.100 |

In this Example, the radius of curvature R1 of the object-side surface S1 of the first lens L1, the radius of curvature R2 of the image-side surface S2 of the first lens L1 and the center thickness d1 of the first lens L1 satisfy R1/(R2+d1)= 1.070. The maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.025. The total optical length TTL of the optical lens assembly and the total focal length F of the optical lens assembly satisfy TTL/F=4.273. The optical back focal length BFL of the optical lens assembly and the total optical length TTL of the optical lens assembly satisfy BFL/TTL=0.202. The air gap D12 between the first lens L1 and the second lens L2 and the total optical length TTL of the optical lens assembly satisfy D12/TTL=0.218. The focal length F567 of the second cemented lens and the total focal length F of the optical lens assembly satisfy F567/F=3.722. The radius of curvature R7 of the object-side surface S7 of the fourth lens L4 and the radius of curvature R8 of the image-side surface S8 of the fourth lens L4 satisfy |R7/R8|=0.602.

Example 3

Figure 3:
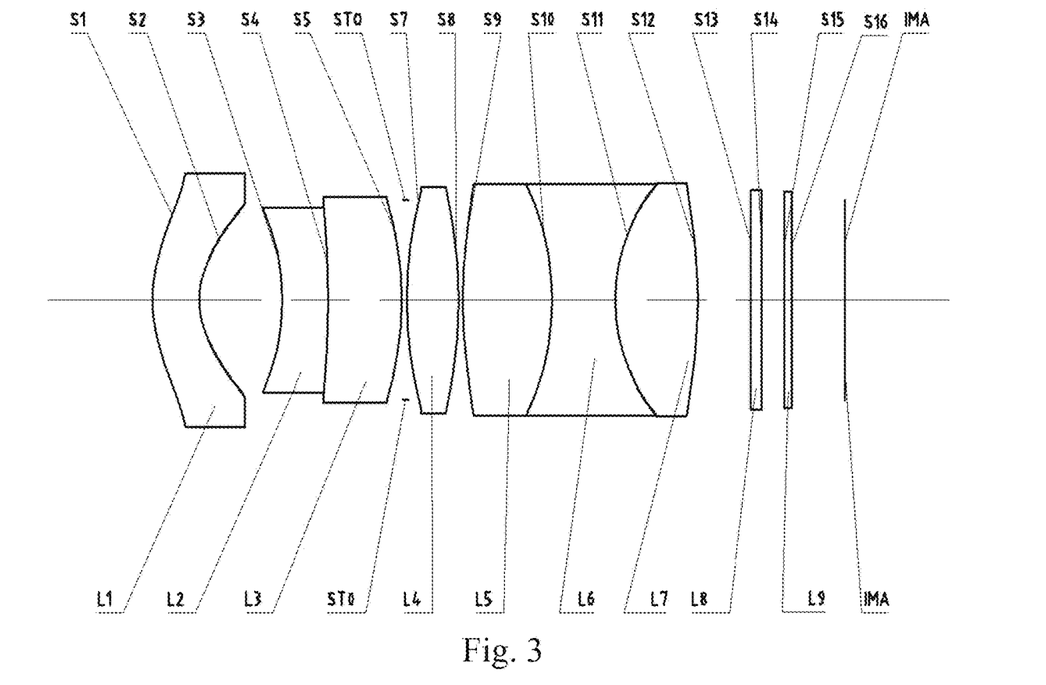
FIG. 3 is a schematic structural diagram showing an optical lens assembly according to Example 3 of the present disclosure.

An optical lens assembly according to Example 3 of the present disclosure is described below with reference to FIG. 3. FIG. 3 shows a schematic structural diagram of the optical lens assembly according to Example 3 of the present disclosure.

As shown in FIG. 3, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a meniscus lens having negative refractive power, and its object-side surface S1 is convex and its image-side surface S2 is concave.

The second lens L2 is a meniscus lens having negative refractive power, and its object-side surface S3 is concave and its image-side surface S4 is convex. The third lens L3 is a meniscus lens having positive refractive power, and its object-side surface S4 is concave and its image-side surface S5 is convex. The second lens L2 and the third lens L3 are cemented to each other to form a first cemented lens.

The fourth lens L4 is a biconvex lens having positive refractive power, and both of its object-side surface S7 and its image-side surface S8 are convex.

The fifth lens L5 is a biconvex lens having positive refractive power, and both of its object-side surface S9 and its image-side surface S10 are convex. The sixth lens L6 is a biconcave lens having negative refractive power, and both of its object-side surface S10 and its image-side surface S11 are concave. The seventh lens L7 is a biconvex lens having positive refractive power, and both of its object-side surface S11 and its image-side surface are convex. The fifth lens L5, the sixth lens L6 and the seventh lens L7 are cemented to each other to form a second cemented lens.

In the present example, each of the first lens L1, the fifth lens L5 and the seventh lens L7 is an aspheric lens. Both of the object-side surface S1 and the image-side surface S2 of the first lens L1 are aspheric, and the object-side surface S9 of the fifth lens L5 is aspheric, and the image-side surface S12 of the seventh lens L7 is aspheric.

Optionally, the optical lens assembly may further include a filter L8 having an object-side surface S13 and an image-side surface S14 and a protective lens L9 having an object-side surface S15 and an image-side surface 516. The filter L8 may be used to correct color deviations. The protective lens L9 can be used to protect the image sensing chip located on the imaging plane IMA. The light from an object sequentially passes through the respective surfaces S1 to S16 and is finally imaged on the imaging plane IMA.

In the optical lens assembly of the present example, a stop STO may be provided between the third lens L3 and the fourth lens L4 to improve the imaging quality.

Table 7 shows the radius of curvature R, the thickness T, the refractive index Nd, and the Abbe number Vd of each lens of the optical lens assembly of Example 3, wherein the radius of curvature R and the thickness T are both in units of millimeters (mm). The following table 8 shows the conic coefficient k and the high-order term coefficients A, B, C, D and E applicable to the aspheric surfaces S1-S2, S9 and S12 in Example 3. Table 9 below shows a maximum effective aperture diameter D of the object-side surface S1 of the first lens L1 corresponding to the maximum field-of-view of the optical lens assembly, an image height h corresponding to the maximum field-of-view of the optical lens assembly, the maximum field-of-view FOV of the optical lens assembly, a total optical length TTL of the optical lens assembly, a total focal length F of the optical lens assembly, an optical back focal length BFL of the optical lens assembly, an air gap D12 between the first lens L1 and the second lens L2, a focal length F567 of the second cemented lens, a radius of curvature R1 of the object-side surface S1 of the first lens L1, a radius of curvature R2 of the image-side surface S2 of the first lens L1, a center thickness d1 of the first lens L1, a radius of curvature R7 of the object-side surface S7 of the fourth lens L4, and a radius of curvature R8 of the image-side surface S8 of the fourth lens L4 of Example 3.

TABLE 7

| Surface No. | Radius of curvature R | Thickness T | Refractive index Nd | Abbe number Vd |
|---|---|---|---|---|
| S1 | 6.4000 | 2.4000 | 1.81 | 41.00 |
| S2 | 3.6300 | 4.3000 | | |
| S3 | −9.1000 | 2.3000 | 1.53 | 66.22 |
| S4 | −41.3000 | 3.7000 | 1.88 | 40.81 |
| S5 | −14.0000 | 0.1000 | | |
| STO | Infinite | 0.1000 | | |
| S7 | 17.0000 | 2.6000 | 1.61 | 49.41 |
| S8 | −19.7000 | 0.2000 | | |
| S9 | 24.0000 | 4.5000 | 1.62 | 63.41 |
| S10 | −10.6000 | 3.1000 | 1.76 | 27.55 |
| S11 | 7.5000 | 4.2000 | 1.74 | 49.34 |
| S12 | −20.0000 | 2.7000 | | |
| S13 | Infinite | 0.5500 | 1.52 | 64.21 |
| S14 | Infinite | 1.5000 | | |
| S15 | Infinite | 0.4000 | 1.52 | 64.21 |
| S16 | Infinite | 2.2000 | | |
| IMA | Infinite | | | |

TABLE 8

| Surface No. | K | A | B | C | D | E |
|---|---|---|---|---|---|---|
| S1 | −3.6934 | 8.2461E−04 | −5.5218E−05 | 1.1309E−06 | −1.3569E−08 | 7.7756E−11 |
| S2 | −1.6562 | 1.4518E−03 | −9.8913E−05 | 2.7868E−06 | −3.3088E−08 | 2.3291E−11 |
| S9 | −0.5403 | −1.3802E−05 | −4.1931E−07 | 4.0986E−09 | 7.8748E−10 | −3.0000E−11 |
| S12 | 8.8975 | 2.4699E−04 | 8.0712E−06 | −3.6328E−07 | 1.3862E−08 | −2.7261E−10 |

TABLE 9

| | |
|---|---|
| D (mm) | 11.34 |
| h (mm) | 8.97 |
| FOV (°) | 68.8 |
| TTL (mm) | 34.85 |
| F (mm) | 8.42 |
| BFL (mm) | 7.350 |
| D12 (mm) | 4.300 |
| F567 (mm) | 22.459 |
| R1 (mm) | 6.40 |
| R2 (mm) | 3.63 |
| d1 (mm) | 2.40 |
| R7 (mm) | 17.000 |
| R8 (mm) | −19.700 |

In this Example, the radius of curvature R1 of the object-side surface S1 of the first lens L1, the radius of curvature R2 of the image-side surface S2 of the first lens L1 and the center thickness d1 of the first lens L1 satisfy R1/(R2+d1)= 1.061. The maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.018. The total optical length TTL of the optical lens assembly and the total focal length F of the optical lens assembly satisfy TTL/F=4.137. The optical back focal length BFL of the optical lens assembly and the total optical length TTL of the optical lens assembly satisfy BFL/TTL=0.211. The air gap D12 between the first lens L1 and the second lens L2 and the total optical length TTL of the optical lens assembly satisfy D12/TTL=0.123. The focal length F567 of the second cemented lens and the total focal length F of the optical lens assembly satisfy F567/F=2.666. The radius of curvature R7 of the object-side surface S7 of the fourth lens L4 and the radius of curvature R8 of the image-side surface S8 of the fourth lens L4 satisfy |R7/R8|=0.863.

Example 4

Figure 4:
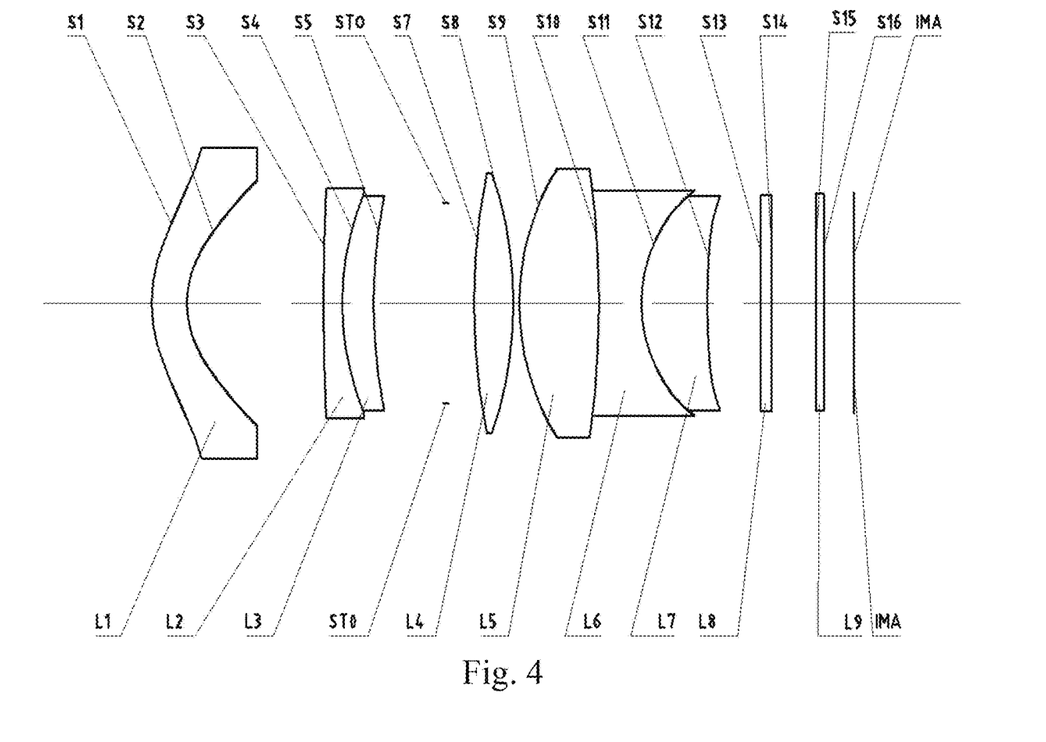
FIG. 4 is a schematic structural diagram showing an optical lens assembly according to Example 4 of the present disclosure.

An optical lens assembly according to Example 4 of the present disclosure is described below with reference to FIG. 4. FIG. 4 shows a schematic structural diagram of the optical lens assembly according to Example 4 of the present disclosure.

As shown in FIG. 4, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a meniscus lens having negative refractive power, and its object-side surface S1 is convex and its image-side surface S2 is concave.

The second lens L2 is a meniscus lens having negative refractive power, and its object-side surface S3 is convex and its image-side surface S4 is concave. The third lens L3 is a meniscus lens having positive refractive power, and its object-side surface S4 is convex and its image-side surface S5 is concave. The second lens L2 and the third lens L3 are cemented to each other to form a first cemented lens.

The fourth lens L4 is a biconvex lens having positive refractive power, and both of its object-side surface S7 and its image-side surface S8 are convex.

The fifth lens L5 is a biconvex lens having positive refractive power, and both of its object-side surface S9 and its image-side surface S10 are convex. The sixth lens L6 is a biconcave lens having negative refractive power, and both of its object-side surface S10 and its image-side surface S11 are concave. The seventh lens L7 is a meniscus lens having positive refractive power, and its object-side surface S11 is convex and its image-side surface S12 is concave. The fifth lens L5, the sixth lens L6 and the seventh lens L7 are cemented to each other to form a second cemented lens.

In the present example, each of the first lens L1, the fifth lens L5 and the seventh lens L7 is an aspheric lens. Both of the object-side surface S1 and the image-side surface S2 of the first lens L1 are aspheric, the object-side surface S9 of the fifth lens L5 is aspheric, and the image-side surface S12 of the seventh lens L7 is aspheric.

Optionally, the optical lens assembly may further include a filter L8 having an object-side surface S13 and an image-side surface S14 and a protective lens L9 having an object-side surface S15 and an image-side surface S16. The filter L8 may be used to correct color deviations. The protective lens L9 can be used to protect the image sensing chip located on the imaging plane IMA. The light from an object sequentially passes through the respective surfaces S1 to S16 and is finally imaged on the imaging plane IMA.

In the optical lens assembly of the present example, a stop STO may be provided between the third lens L3 and the fourth lens L4 to improve the imaging quality.

Table 10 shows the radius of curvature R, the thickness T, the refractive index Nd, and the Abbe number Vd of each lens of the optical lens assembly of Example 4, wherein the radius of curvature R and the thickness T are both in units of millimeters (mm). The following table 11 shows the conic coefficient k and the high-order term coefficients A, B, C, D and E applicable to the aspheric surfaces S1-S2, S9 and S12 in Example 4. Table 12 below shows a maximum effective aperture diameter D of the object-side surface S1 of the first lens L1 corresponding to the maximum field-of-view of the optical lens assembly, an image height h corresponding to the maximum field-of-view of the optical lens assembly, the maximum field-of-view FOV of the optical lens assembly, a total optical length TTL of the optical lens assembly, a total focal length F of the optical lens assembly, an optical back focal length BFL of the optical lens assembly, an air gap D12 between the first lens L1 and the second lens L2, a focal length F567 of the second cemented lens, a radius of curvature R1 of the object-side surface S1 of the first lens L1, a radius of curvature R2 of the image-side surface S2 of the first lens L1, a center thickness d1 of the first lens L1, a radius of curvature R7 of the object-side surface S7 of the fourth lens L4, and a radius of curvature R8 of the image-side surface S8 of the fourth lens L4 of Example 4.

TABLE 10

| Surface No. | Radius of curvature R | Thickness T | Refractive index Nd | Abbe number Vd |
|---|---|---|---|---|
| S1 | 5.5700 | 1.7400 | 1.81 | 41.00 |
| S2 | 3.5000 | 6.9000 | | |
| S3 | 80.0000 | 0.9500 | 1.49 | 70.42 |
| S4 | 11.2000 | 1.5400 | 1.88 | 40.81 |
| S5 | 20.3000 | 3.6000 | | |
| STO | Infinite | 1.4800 | | |
| S7 | 25.3000 | 2.0000 | 1.62 | 63.41 |
| S8 | −15.3000 | 0.2000 | | |
| S9 | 10.0000 | 3.9000 | 1.62 | 63.41 |
| S10 | −37.5000 | 2.1000 | 1.76 | 27.55 |
| S11 | 5.8000 | 3.3000 | 1.74 | 49.34 |
| S12 | 35.2000 | 2.7000 | | |
| S13 | Infinite | 0.5500 | 1.52 | 64.21 |
| S14 | Infinite | 2.5000 | | |

TABLE 10-continued

| Surface No. | Radius of curvature R | Thickness T | Refractive index Nd | Abbe number Vd |
|---|---|---|---|---|
| S15 | Infinite | 0.4000 | 1.52 | 64.21 |
| S16 | Infinite | 1.1899 | | |
| IMA | Infinite | | | |

TABLE 11

| Surface No. | K | A | B | C | D | E |
|---|---|---|---|---|---|---|
| S1 | −2.8731 | 8.2291E−04 | −5.3435E−05 | 1.1864E−06 | −1.3089E−08 | 7.0000E−11 |
| S2 | −1.6468 | 1.6216E−03 | −9.3430E−05 | 2.7586E−06 | −3.5852E−08 | 3.2000E−10 |
| S9 | 0.1015 | 1.1305E−05 | −4.7788E−08 | −9.7165E−09 | 2.1142E−10 | −2.4942E−12 |
| S12 | 40.9213 | 4.5921E−04 | 4.5781E−06 | −2.9380E−07 | 2.2168E−08 | −5.8381E−10 |

TABLE 12

| | |
|---|---|
| D (mm) | 13.98 |
| h (mm) | 9.54 |
| FOV (°) | 68 |
| TTL (mm) | 35.05 |
| F (mm) | 8.48 |
| BFL (mm) | 7.340 |
| D12 (mm) | 6.900 |
| F567 (mm) | 23.611 |
| R1 (mm) | 5.57 |
| R2 (mm) | 3.50 |
| d1 (mm) | 1.74 |
| R7 (mm) | 25.300 |
| R8 (mm) | −15.300 |

In this Example, the radius of curvature R1 of the object-side surface S1 of the first lens L1, the radius of curvature R2 of the image-side surface S2 of the first lens L1 and the center thickness d1 of the first lens L1 satisfy R1/(R2+d1)= 1.063. The maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.022. The total optical length TTL of the optical lens assembly and the total focal length F of the optical lens assembly satisfy TTL/F=4.133. The optical back focal length BFL of the optical lens assembly and the total optical length TTL of the optical lens assembly satisfy BFL/TTL=0.209. The air gap D12 between the first lens L1 and the second lens L2 and the total optical length TTL of the optical lens assembly satisfy D12/TTL=0.197. The focal length F567 of the second cemented lens and the total focal length F of the optical lens assembly satisfy F567/F=2.784. And the radius of curvature R7 of the object-side surface S7 of the fourth lens L4 and the radius of curvature R8 of the image-side surface S8 of the fourth lens L4 satisfy |R7/R8|=1.654.

Example 5

Figure 5:
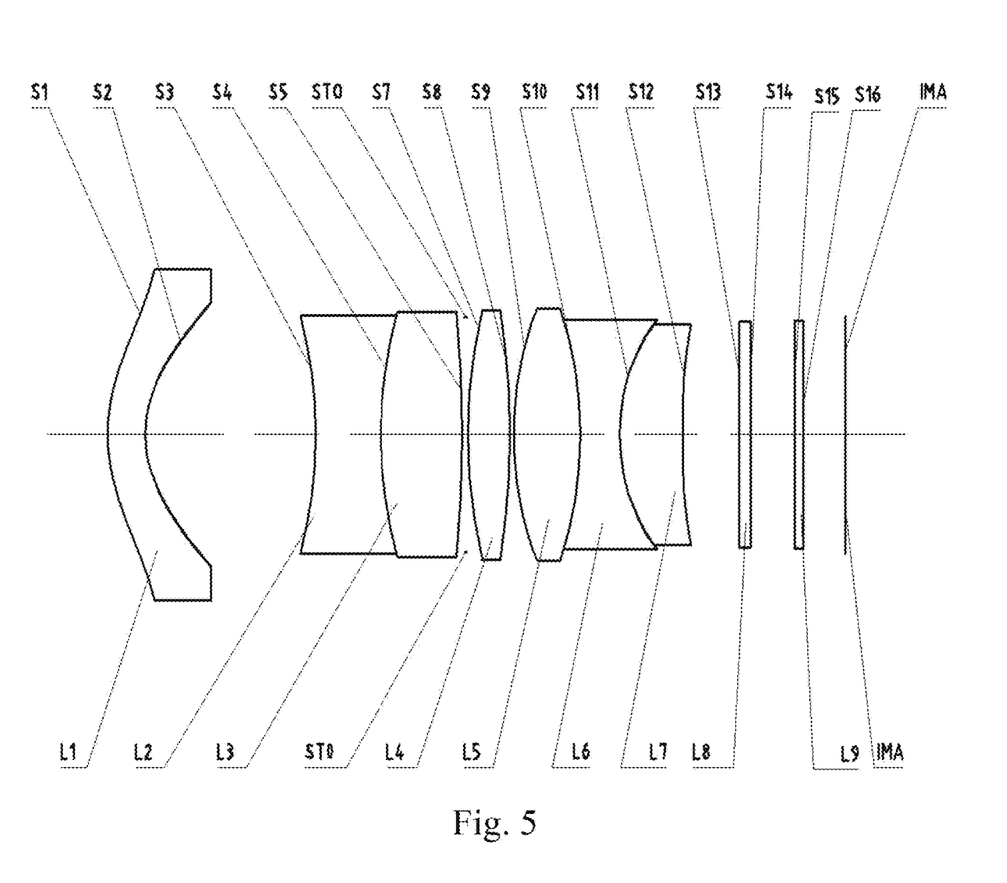
FIG. 5 is a schematic structural diagram showing an optical lens assembly according to Example 5 of the present disclosure.

An optical lens assembly according to Example 5 of the present disclosure is described below with reference to FIG. 5. FIG. 5 shows a schematic structural diagram of the optical lens assembly according to Example 5 of the present disclosure.

As shown in FIG. 5, the optical lens assembly includes a first lens L1, a second lens L2, a third lens L3, a fourth lens L4, a fifth lens L5, a sixth lens L6, and a seventh lens L7, which are sequentially arranged along an optical axis from an object side to an imaging side of the optical lens assembly.

The first lens L1 is a meniscus lens having negative refractive power, and its object-side surface S1 is convex and its image-side surface S2 is concave.

The second lens L2 is a biconcave lens having negative refractive power, and both of its object-side surface S3 and its image-side surface S4 are concave. The third lens L3 is a biconvex lens having positive refractive power, and both of its object-side surface S4 and its image-side surface S5 are convex. The second lens L2 and the third lens L3 are cemented to each other to form a first cemented lens.

The fourth lens L4 is a biconvex lens having positive refractive power, and both of its object-side surface S7 and its image-side surface S8 are convex.

The fifth lens L5 is a biconvex lens having positive refractive power, and both of its object-side surface S9 and its image-side surface S10 are convex. The sixth lens L6 is a biconcave lens having negative refractive power, and both of its object-side surface S10 and its image-side surface S11 are concave. The seventh lens L7 is a meniscus lens having positive refractive power, and its object-side surface S11 is convex and its image-side surface S12 is concave. The fifth lens L5, the sixth lens L6 and the seventh lens L7 are cemented to each other to form a second cemented lens.

In the present example, each of the first lens L1, the fifth lens L5 and the seventh lens L7 is an aspheric lens. Both of the object-side surface S1 and the image-side surface S2 of the first lens L1 are aspheric, the object-side surface S9 of the fifth lens L5 is aspheric, and the image-side surface S12 of the seventh lens L7 is aspheric.

Optionally, the optical lens assembly may further include a filter L8 having an object-side surface S13 and an image-side surface S14 and a protective lens L9 having an object-side surface S15 and an image-side surface S16. The filter L8 may be used to correct color deviations. The protective lens L9 can be used to protect the image sensing chip located on the imaging plane IMA. The light from an object sequentially passes through the respective surfaces S1 to S16 and is finally imaged on the imaging plane IMA.

In the optical lens assembly of the present example, a stop STO may be provided between the third lens L3 and the fourth lens L4 to improve the imaging quality.

Table 13 shows the radius of curvature R, the thickness T, the refractive index Nd, and the Abbe number Vd of each lens of the optical lens assembly of Example 5, wherein the radius of curvature R and the thickness T are both in units of millimeters (mm). The following table 14 shows the conic coefficient k and the high-order term coefficients A, B, C, D and E applicable to the aspheric surfaces S1-S2, S9 and S12 in Example 5. Table 15 below shows a maximum effective aperture diameter D of the object-side surface S1 of the first lens L1 corresponding to the maximum field-of-view of the optical lens assembly, an image height h corresponding to the maximum field-of-view of the optical lens assembly, the maximum field-of-view FOV of the optical lens assembly, a total optical length TTL of the optical lens assembly, a total focal length F of the optical lens assembly, an optical back focal length BFL of the optical lens assembly, an air gap D12 between the first lens L1 and the second lens L2, a focal length F567 of the second cemented lens, a radius of curvature R1 of the object-side surface S1 of the first lens L1, a radius of curvature R2 of the image-side surface S2 of the first lens L1, a center thickness d1 of the first lens L1, a radius of curvature R7 of the object-side surface S7 of the fourth lens L4, and a radius of curvature R8 of the image-side surface S8 of the fourth lens L4 of Example 5.

TABLE 13

| Surface No. | Radius of curvature R | Thickness T | Refractive index Nd | Abbe number Vd |
|---|---|---|---|---|
| S1 | 5.9000 | 1.7800 | 1.81 | 41.00 |
| S2 | 3.7000 | 8.1500 | | |
| S3 | −15.4000 | 3.1000 | 1.49 | 70.42 |
| S4 | 15.0000 | 3.8400 | 1.88 | 40.81 |
| S5 | −42.7000 | 0.1000 | | |
| STO | Infinite | 0.1000 | | |
| S7 | 18.3000 | 2.0000 | 1.62 | 63.41 |
| S8 | −26.5000 | 0.1900 | | |
| S9 | 12.0000 | 3.2000 | 1.62 | 63.41 |
| S10 | −13.2000 | 1.8500 | 1.76 | 27.55 |
| S11 | 6.6000 | 3.0000 | 1.74 | 49.34 |
| S12 | 46.0000 | 2.7000 | | |
| S13 | Infinite | 0.5500 | 1.52 | 64.21 |
| S14 | Infinite | 2.1000 | | |
| S15 | Infinite | 0.4000 | 1.52 | 64.21 |
| S16 | Infinite | 2.0000 | | |
| IMA | Infinite | | | |

TABLE 14

| Surface No. | K | A | B | C | D | E |
|---|---|---|---|---|---|---|
| S1 | −3.1953 | 8.1699E−04 | −5.3448E−05 | 1.1829E−06 | −1.3164E−08 | 1.1968E−10 |
| S2 | −1.7777 | 1.5885E−03 | −9.3414E−05 | 1.3828E−06 | −7.0601E−08 | 5.3157E−11 |
| S9 | 0.1786 | 1.9528E−05 | 9.7120E−08 | −1.1842E−08 | 2.2430E−10 | −3.4680E−12 |
| S12 | 73.4567 | 4.0860E−04 | 2.9432E−06 | −3.1098E−07 | 1.8866E−08 | −1.0747E−09 |

TABLE 15

| | |
|---|---|
| D (mm) | 9.70 |
| h (mm) | 9.34 |
| FOV (°) | 68 |
| TTL (mm) | 35.06 |
| F (mm) | 8.44 |
| BFL (mm) | 7.750 |
| D12 (mm) | 8.150 |
| F567 (mm) | 37.220 |
| R1 (mm) | 5.90 |
| R2 (mm) | 3.70 |
| d1 (mm) | 1.78 |
| R7 (mm) | 18.300 |
| R8 (mm) | −26.500 |

In this Example, the radius of curvature R1 of the object-side surface S1 of the first lens L1, the radius of curvature R2 of the image-side surface S2 of the first lens L1 and the center thickness d1 of the first lens L1 satisfy R1/(R2+d1)= 1.077. The maximum field-of-view FOV of the optical lens assembly, the maximum effective aperture diameter D of the object-side surface S1 of the first lens L1 corresponding to the maximum field-of-view of the optical lens assembly and the image height h corresponding to the maximum field-of-view of the optical lens assembly satisfy D/h/FOV=0.015. The total optical length TTL of the optical lens assembly and the total focal length F of the optical lens assembly satisfy TTL/F=4.155. The optical back focal length BFL of the optical lens assembly and the total optical length TTL of the optical lens assembly satisfy BFL/TTL=0.221. The air gap D12 between the first lens L1 and the second lens L2 and the total optical length TTL of the optical lens assembly satisfy D12/TTL=0.232. The focal length F567 of the second cemented lens and the total focal length F of the optical lens assembly satisfy F567/F=4.411. The radius of curvature R7 of the object-side surface S7 of the fourth lens L4 and the radius of curvature R8 of the image-side surface S8 of the fourth lens L4 satisfy |R7/R8|=0.691.

In view of the above, Examples 1 to 5 satisfy the relationships shown in Table 16 below, respectively.

TABLE 16

| | Example | | | | |
|---|---|---|---|---|---|
| Condition | 1 | 2 | 3 | 4 | 5 |
| R1/(R2 + d1) | 1.057 | 1.070 | 1.061 | 1.063 | 1.077 |
| D/h/FOV | 0.019 | 0.025 | 0.018 | 0.022 | 0.015 |
| TTL/F | 4.317 | 4.273 | 4.137 | 4.133 | 4.155 |
| BFL/TTL | 0.205 | 0.202 | 0.211 | 0.209 | 0.221 |
| D12/TTL | 0.215 | 0.218 | 0.123 | 0.197 | 0.232 |
| F567/F | 3.722 | 3.722 | 2.666 | 2.784 | 4.411 |
| |R7/R8| | 0.604 | 0.602 | 0.863 | 1.654 | 0.691 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising:
   a first lens, a second lens, a third lens, a fourth lens, a fifth lens, a sixth lens, and a seventh lens, which are arranged sequentially from an object side to an image side of the optical lens assembly along an optical axis, wherein,
   the first lens has negative refractive power, and an object-side surface of the first lens is convex and an image-side surface of the first lens is concave;
   the fourth lens has positive refractive power, and each of an object-side surface and an image-side surface of the fourth lens is convex;
   the fifth lens has positive refractive power, and each of an object-side surface and an image-side surface of the fifth lens is convex;
   the sixth lens has negative refractive power, and each of an object-side surface and an image-side surface of the sixth lens is concave; and the seventh lens has positive refractive power, and an object-side surface of the seventh lens is convex, and wherein a maximum field-of-view FOV of the optical lens assembly, a maximum effective aperture diameter D of the object-side surface of the first lens corresponding to the maximum field-of-view of the optical lens assembly, and an image height h corresponding to the maximum field-of-view of the optical lens assembly satisfy D/h/FOV≤0.035.

2. The optical lens assembly according to claim 1,
wherein the second lens has negative refractive power, and an object-side surface of the second lens is concave and an image-side surface of the second lens is convex, and the third lens has positive refractive power, and an object-side surface of the third lens is concave and an image-side surface of the third lens is convex, or wherein the second lens has negative refractive power, and an object-side surface of the second lens is convex and an image-side surface of the second lens is concave, and the third lens has positive refractive power, and an object-side surface of the third lens is convex and an image-side surface of the third lens is concave, or wherein the second lens has negative refractive power, and each of an object-side surface and an image-side surface of the second lens is concave, and the third lens has positive refractive power, and each of an object-side surface and an image-side surface of the third lens is convex.

3. The optical lens assembly according to claim 1, wherein the second lens and the third lens are cemented to form a first cemented lens, and
wherein the fifth lens, the sixth lens and the seventh lens are cemented to form a second cemented lens.

4. The optical lens assembly according to claim 1, wherein a radius of curvature R1 of the object-side surface of the first lens, a radius of curvature R2 of the image-side surface of the first lens and a center thickness d1 of the first lens satisfy 0.5≤R1/(R2+d1)≤1.5.

5. The optical lens assembly according to claim 1, wherein a radius of curvature R7 of the object-side surface of the fourth lens and a radius of curvature R8 of the image-side surface of the fourth lens satisfy |R7/R8|≤3.5.

6. The optical lens assembly according to claim 1, wherein a distance TTL along the optical axis from a center of the object-side surface of the first lens to an imaging plane of the optical lens assembly and a total focal length F of the optical lens assembly satisfy TTL/F≤4.8.

7. The optical lens assembly according to claim 1, wherein a distance TTL along the optical axis from a center of the object-side surface of the first lens to an imaging plane of the optical lens assembly, and a distance BFL along the optical axis from a center of an image-side surface of the seventh lens to the imaging plane of the optical lens assembly satisfy BFL/TTL≥0.11.

8. The optical lens assembly according to claim 1, wherein D12/TTL≥0.08, where D12 is an air gap between the first lens and the second lens, and
TTL is a distance along the optical axis from a center of the object-side surface of the first lens to an imaging plane of the optical lens assembly.

9. The optical lens assembly according to claim 1, wherein a focal length F567 of a cemented lens consisted of the fifth lens, the sixth lens and the seventh lens and a total focal length F of the optical lens assembly satisfy F567/F≤8.

10. The optical lens assembly according to claim 1, wherein the optical lens assembly satisfies at least one of:

TTL/F≤4.5, TTL being a distance along the optical axis from a center of the object-side surface of the first lens to an imaging plane of the optical lens assembly, and F being a total focal length;

0.602≤|R7/R8|≤3.5, R7 being a radius of curvature of the object-side surface of the fourth lens and R8 being a radius of curvature of the image-side surface of the fourth lens;

0.08≤D12/TTL≤0.232, D12 being an air gap between the first lens and the second lens; or 2.666≤F567/F≤8, F567 being a focal length of a cemented lens consisted of the fifth lens, the sixth lens and the seventh lens.

11. An optical lens assembly, comprising:
a first lens, a second lens, a third lens, a fourth lens, a fifth lens, a sixth lens, and a seventh lens, which are arranged sequentially from an object side to an image side of the optical lens assembly along an optical axis, wherein,
each of the first lens, the second lens and the sixth lens has negative refractive power;
each of the third lens, the fourth lens, the fifth lens and the seventh lens has positive refractive power;
the second lens and the third lens are cemented to each other to form a first cemented lens; and
the fifth lens, the sixth lens and the seventh lens are cemented to form a second cemented lens;
wherein a distance TTL along the optical axis from a center of an object-side surface of the first lens to an imaging plane of the optical lens assembly and a total focal length F of the optical lens assembly satisfy TTL/F≤4.8.

12. The optical lens assembly according to claim 11, wherein an object-side surface of the first lens is convex and an image-side surface of the first lens is concave; and each of an object-side surface and an image-side surface of the fourth lens is convex.

13. The optical lens assembly according to claim 11,
wherein an object-side surface of the second lens is concave and an image-side surface of the second lens is convex, and an object-side surface of the third lens is concave and an image-side surface of the third lens is convex, or wherein an object-side surface of the second lens is convex and an image-side surface of the second lens is concave, and an object-side surface of the third lens is convex and an image-side surface of the third lens is concave, or wherein each of an object-side surface and an image-side surface of the second lens is concave, and each of an object-side surface and an image-side surface of the third lens is convex.

14. The optical lens assembly according to claim 11,
wherein each of an object-side surface and an image-side surface of the fifth lens is convex, each of an object-side surface and an image-side surface of the sixth lens is concave, and each of an object-side surface and an image-side surface of the seventh lens is convex, or wherein each of an object-side surface and an image-side surface of the fifth lens is convex, each of an object-side surface and an image-side surface of the sixth lens is concave, and an object-side surface of the seventh lens is convex and an image-side surface of the seventh lens is concave.

15. The optical lens assembly according to claim 11, wherein a radius of curvature R1 of the object-side surface of the first lens, a radius of curvature R2 of the image-side surface of the first lens and a center thickness d1 of the first lens satisfy 0.5≤R1/(R2+d1)≤1.5.

16. The optical lens assembly according to claim 11, wherein a radius of curvature R7 of an object-side surface of the fourth lens and a radius of curvature R8 of an image-side surface of the fourth lens satisfy |R7/R8|≤3.5, or 0.602≤|R7/R8|≤3.5.

17. The optical lens assembly according to claim 11, wherein a maximum field-of-view FOV of the optical lens assembly, a maximum effective aperture diameter D of the object-side surface of the first lens corresponding to the maximum field-of-view of the optical lens assembly, and an image height h corresponding to the maximum field-of-view of the optical lens assembly satisfy D/h/FOV ≤0.035.

18. The optical lens assembly according to claim 11, wherein the distance TTL along the optical axis from the center of the object-side surface of the first lens to the imaging plane of the optical lens assembly, and a distance BFL along the optical axis from a center of an image-side surface of the seventh lens to the imaging plane of the optical lens assembly satisfy BFL/TTL≥0.11.

19. The optical lens assembly according to claim 11, wherein D12/TTL ≥0.08,
where D12 is an air gap between the first lens and the second lens, and
TTL is the distance along the optical axis from the center of the object-side surface of the first lens to the imaging plane of the optical lens assembly, or
0.08≤D12/TTL≤0.232, or
TTL/F≤4.5, F being a total focal length of the optical lens assembly.

20. The optical lens assembly according to claim 11, wherein a focal length F567 of the second cemented lens and a total focal length F of the optical lens assembly satisfy F567/F≤8 or
2.666≤F567/F≤8.

* * * * *